(No Model.) 4 Sheets—Sheet 2.

T. HENNESSY.
GAS APPARATUS.

No. 569,716. Patented Oct. 20, 1896.

Witnesses
CC Burdick
C. B. Bull

Inventor:
Thomas Hennessy
by Dodge & Sons,
Attorneys.

(No Model.)

T. HENNESSY.
GAS APPARATUS.

No. 569,716. Patented Oct. 20, 1896.

Witnesses

Inventor:
Thos. Hennessy,
by Dodge & Sons,
Attorneys

UNITED STATES PATENT OFFICE.

THOMAS HENNESSY, OF EXCELSIOR SPRINGS, MISSOURI.

GAS APPARATUS.

SPECIFICATION forming part of Letters Patent No. 569,716, dated October 20, 1896.

Application filed September 24, 1895. Serial No. 563,523. (No model.)

*To all whom it may concern:*

Be it known that I, THOMAS HENNESSY, a citizen of the United States, residing at Excelsior Springs, in the county of Clay and State of Missouri, have invented certain new and useful Improvements in Gas Apparatus, of which the following is a specification.

My invention relates to apparatus for the manufacture of gas from oil; and it consists in various novel features, details, and combinations hereinafter set forth and claimed.

Figure 1:
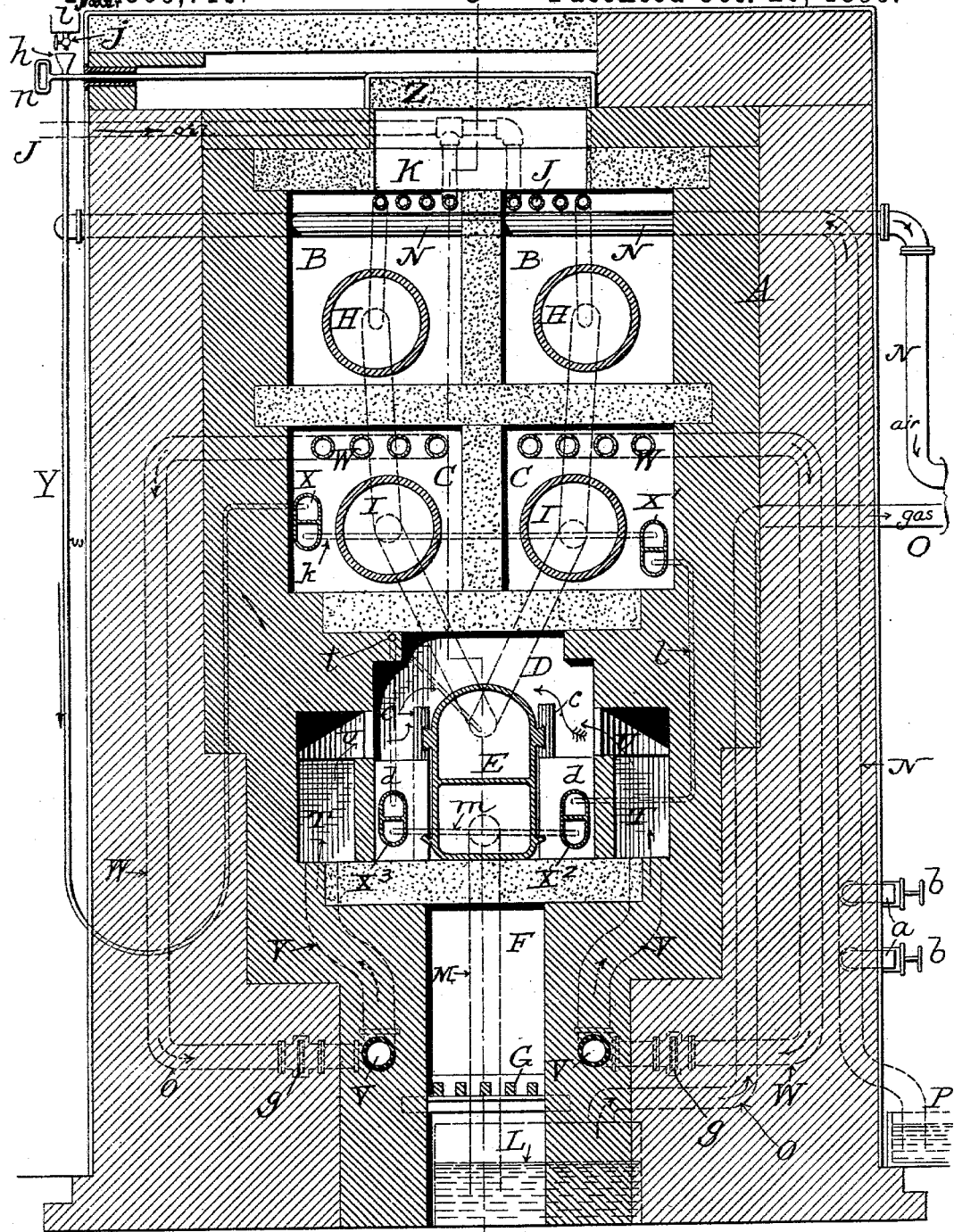
Figure 2:
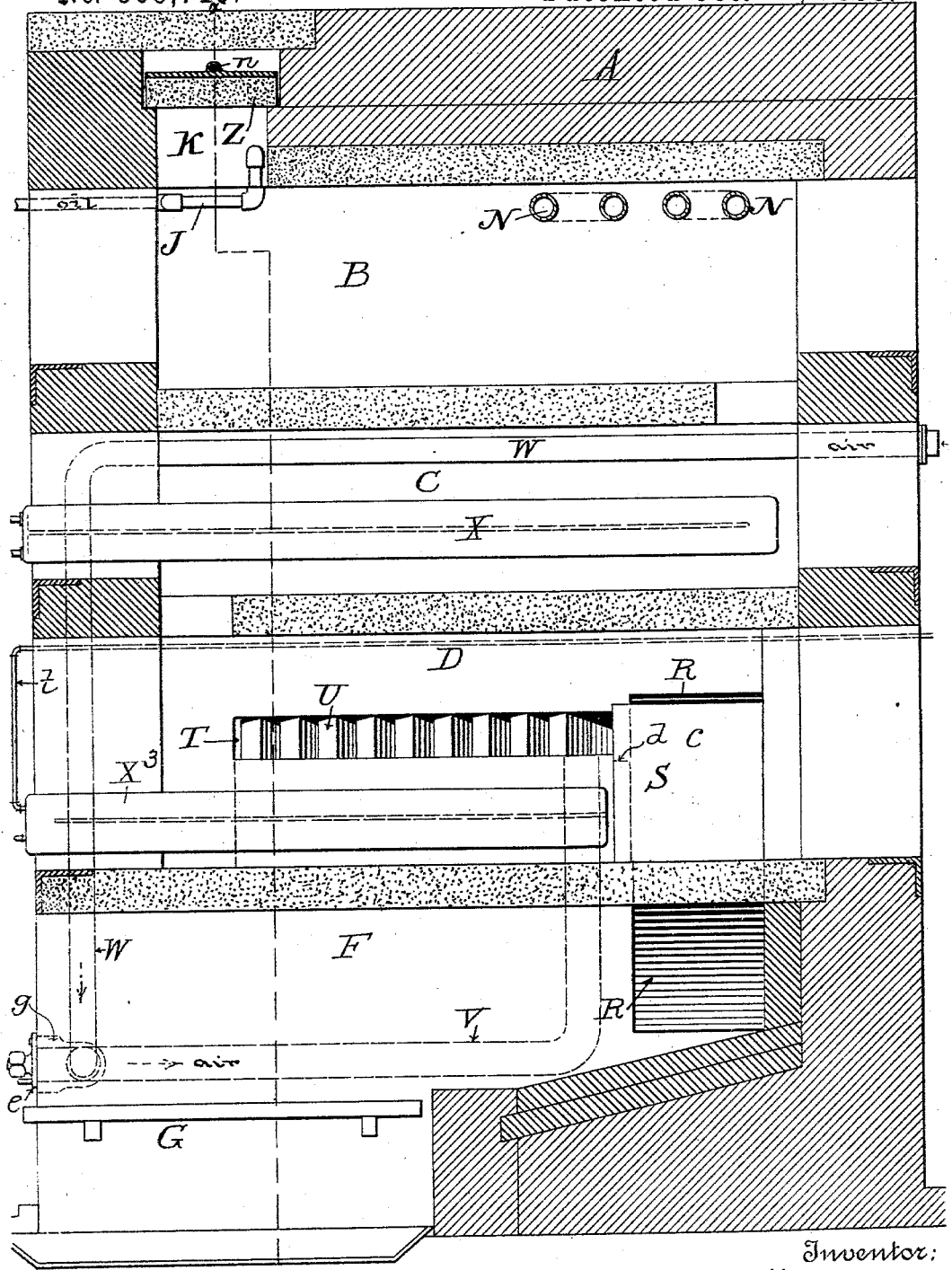
Figure 3:
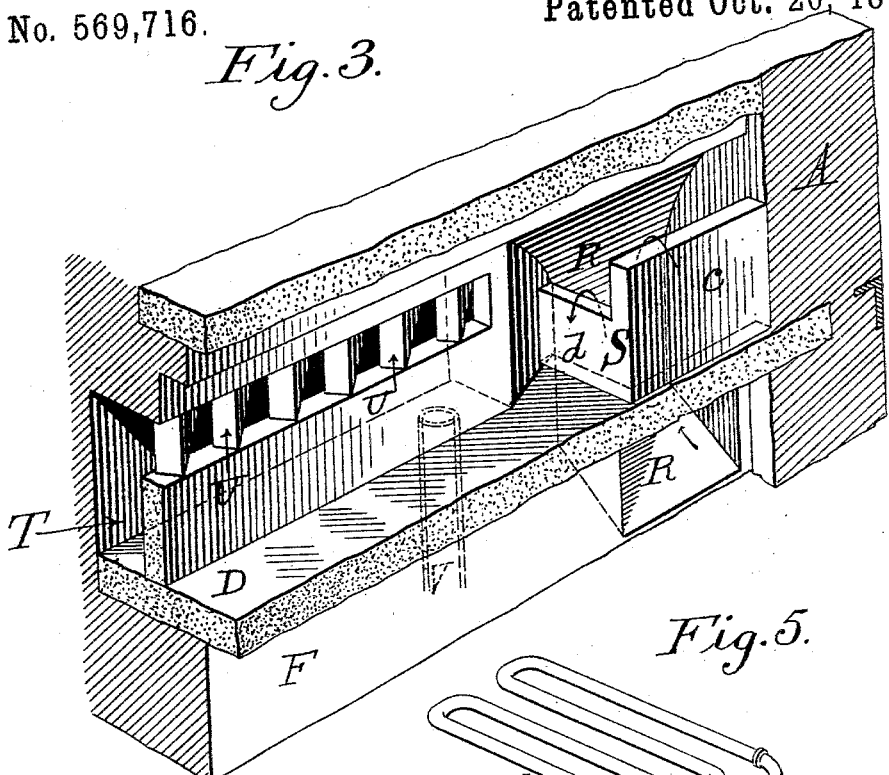
Figure 5:
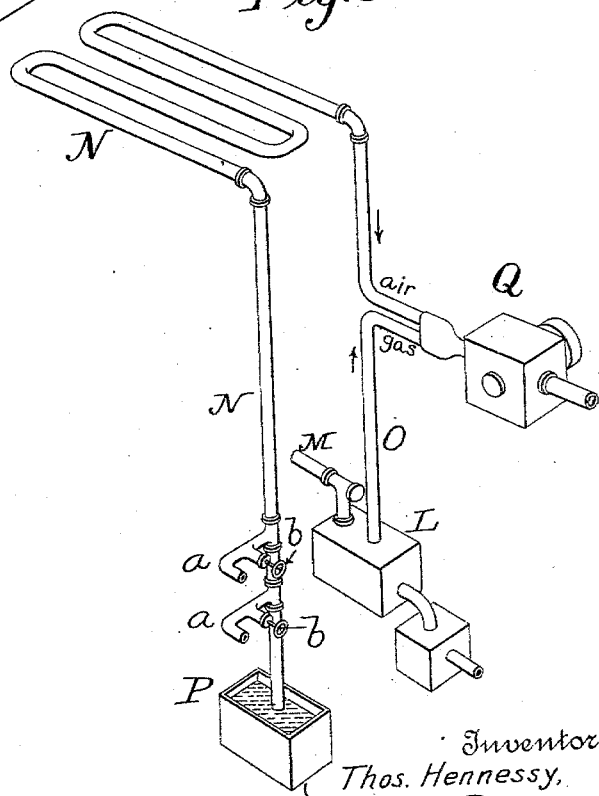
Figure 4:
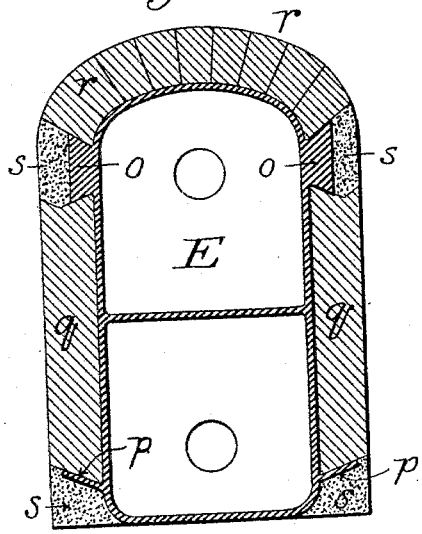

In the drawings, Figure 1 is a vertical transverse sectional view through my improved apparatus on the line $x\ x$ of Fig. 2; Fig. 2, a vertical longitudinal sectional view of the same on the line $y\ y$ of Fig. 1, with the gas-retorts omitted to more clearly show the construction of the setting; Fig. 3, a sectional perspective view of the combustion-chamber in which the fixing-retort is placed; Fig. 4, a vertical transverse sectional view of the fixing-retort; Fig. 5, a perspective view showing the arrangement of the air-and-gas mixing pipes, and Fig. 6 a front-face view of the retort-setting.

A indicates the retort-setting as a whole, constructed of the usual materials, and provided with the retort-chambers B B and C C, a combustion-chamber D in which is placed the fixing-retort E, and beneath the chamber D a fire-chamber F, containing a grate G, as clearly shown in Figs. 1 and 2.

In the chambers B C are the retorts H H I I, which are connected with each other and with the fixing-retort in the usual manner, as shown in dotted lines, Fig. 1.

J indicates an oil-supply pipe which is formed into a coil in line with the discharge flue or opening K and connects with the upper retorts H H, substantially as in Patent No. 531,530, issued to me December 25, 1894.

There is employed in the present instance, as in the patent before referred to, a seal L for the gas-pipe M and an air-heating coil or pipe N, which delivers the heated air to a suitable point where it is mixed with the gas drawn away through or carried off by the pipe O. It will be noted, however, upon reference to Figs. 1 and 5, that the air-pipe N is provided on its intake-leg with two branches $a$, each of which is open to the atmosphere, and each of which is also provided with a valve $b$, that portion of the pipe below the branches and valves being carried into a seal P, as clearly shown in Figs. 1 and 5.

By providing the pipe N with two inlets the amount of air to be admitted to the pipe N may be more readily controlled than if a single inlet of the same diameter as the pipe were employed. This is due to the fact that the regulation by the attendant is determined in great measure by the hissing sound produced by the air entering the inlets, and it has been found in practice that by providing two small inlets the hissing sound is more apt to give a true indication of the amount of air being drawn in than if a single large inlet is used.

If from any cause the engine should be stopped, the gas between the exhauster Q and the seal L might pass into the air-pipe, which, being highly heated, would ignite the gas and cause an explosion. In order to avoid such a contingency as this, the lower end of the air-pipe N is extended into the seal P, as shown in Fig. 5, so that if ignition should take place within the pipe it would simply blow the water out of the seal and ignite the amount of gas that had blown in from the pipe, the seal P thus forming a relief or safety device to prevent injury to the apparatus.

The fire-chamber F has no communication with the combustion-chamber D except at the rear end, where I provide flues R at each side, as clearly shown in Figs. 1, 2, and 3, the slab or tile forming the roof of the fire-chamber or the bottom of the combustion-chamber being cut away or made narrower at its rear end to avoid carrying the flue too far inward into the setting or brickwork.

In the combustion-chamber D, at the delivery end or mouth of the flues, there are two boxes S, whose inner walls are formed by a comparatively high slab or tile $c$, while the front walls are formed of a lower tile or slab $d$, as clearly shown in Figs. 1 and 3. These slabs $c$, which form the outer sides of the boxes S, should extend up nearly to the top of the fixing-retort E, so as to prevent the hot products of combustion from coming into direct contact with the retort. It will be noted also that by making the front wall of the box lower than the side walls the tendency of the products to move forward along the combustion-chamber is increased. In order to promote or insure the combustion within the chamber D, I provide means for delivering quantities of heated air into the combustion-chamber, such air being heated by the waste products of combustion or by being passed through a pipe or passage in the walls of the fire-chamber.

Upon reference to Figs. 1, 2, and 3 it will be noticed that there is at each side of the combustion-chamber D an air space or chamber T, which communicates with the combustion-chamber through the checker brickwork U, the said bricks inclining forwardly in the direction in which the products pass through the chamber D.

Figure 6:
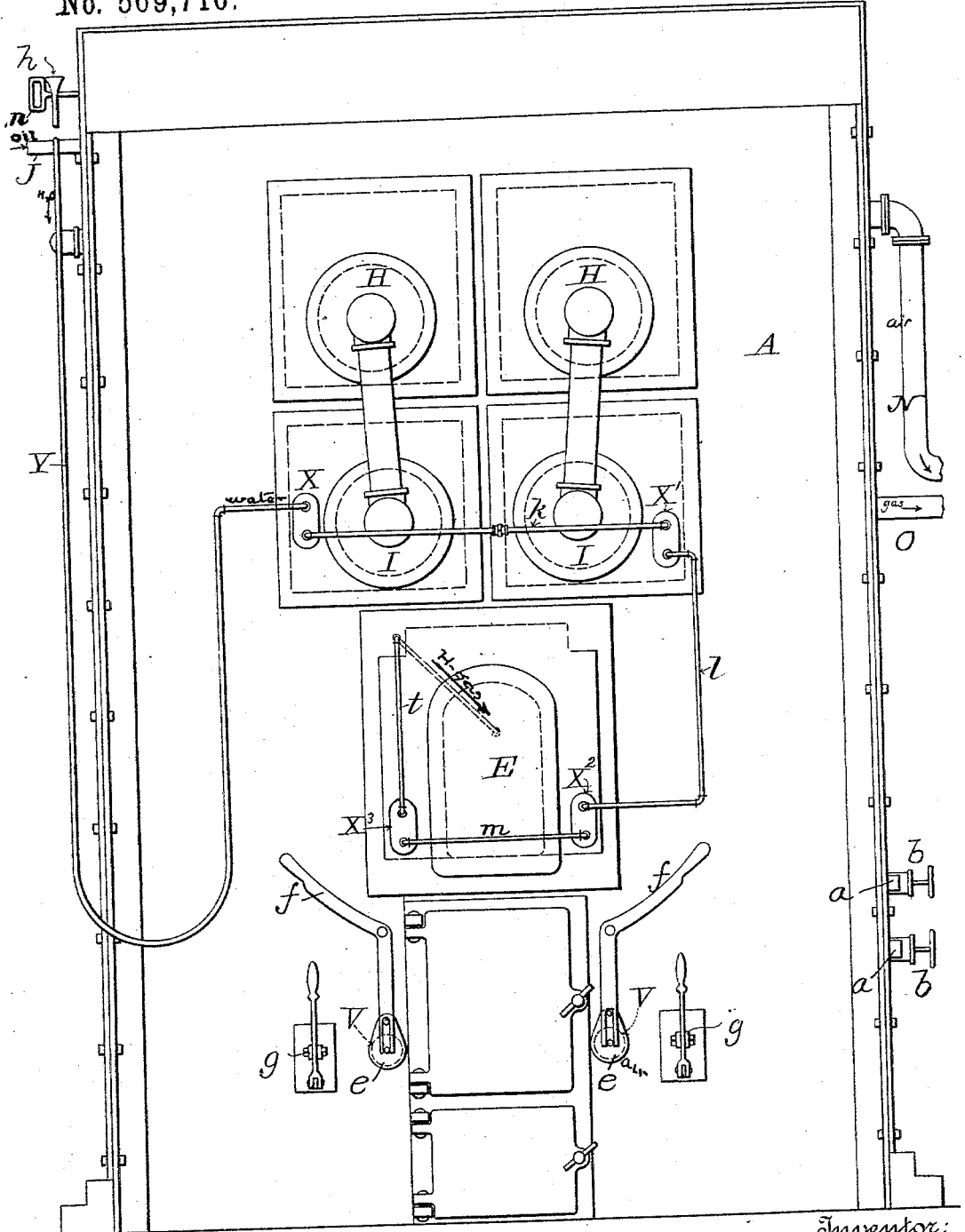

A pipe V is embedded in the walls of the fire-chamber and communicates at one end with the air space or chamber T and at the other end opens into the atmosphere, preferably at the front of the retort-setting, as shown in Figs. 2 and 6, the said pipe being provided with a swinging gate or valve $e$, which is controlled by levers $f$ or in any other suitable manner. When these valves $e$ are opened, the air drawn in through the pipe V becomes heated and is delivered into the air passage or chamber T, from which it is discharged in small jets at points throughout the length of the combustion-chamber, and, mixing with the products which have passed up from the fire-chamber, promote or insure thorough combustion in the said chamber D.

In addition to the pipe V is a second pipe W, which is coiled back and forth through any of the retort-chambers, preferably in the chambers C C, as shown in Figs. 1 and 2. The said pipe W is open at the rear of the retort-setting to the atmosphere, while its opposite end extends downward and connects with the pipe V, as shown in Figs. 1 and 2.

In the pipe W is placed a valve $g$, whose stem or handle projects out through the front of the retort-setting, as shown in Fig. 6, so that it may be readily controlled. From this construction it will be seen that air admitted through the pipe W is heated by the waste products of combustion and delivered through the pipe V into the air space or chamber T and from said chamber into the combustion-chamber. It is obvious that either of these two air-supply devices may be used independently of each other by proper manipulation of the valves or that they may be used together.

It will be noticed upon reference to Figs. 1 and 2 that the pipe V is made larger than the pipe W in order that the former may deliver to the chamber T not only the air which is drawn through the pipe W, but also that air which is drawn in at the mouth of the pipe V. While I prefer to employ pipes in the walls of the fire-chamber, it is obvious that a passage could be made in the brickwork and the pipes be omitted.

In order to deliver to the fixing-retort a quantity of hydrogen to be mixed with the gas, I employ one or more generators X X' $X^2 X^3$, preferably four, which are connected with each other and with the fixing-retort, and which generators are preferably located in the retort-chambers C C and D, so that they may be heated gradually and with increasing degree by the products of combustion from the fire-chamber F. These generators X, &c., as shown in Figs. 1 and 2, comprise merely a long hollow box divided by a diaphragm which extends nearly throughout the length thereof, or, if preferred, pipes may be employed. The first retort X is connected by means of a trapped pipe Y with a funnel or cup $h$, Fig. 1, into which water flows drop by drop from a tank or other water supply $i$, having a controlling cock or valve $j$. The water thus finds its way gradually into the first generator X, which, being moderately heated, converts the water into steam, and the steam is carried along from one end of the generator to the other and transferred by the pipe $k$ to the second generator X' in the opposite chamber C, where the steam in the second generator is still further heated. It should be understood that in each of these generators there will be placed some material, such, for instance, as fragments of iron, which, being heated to a high temperature, deprives the water of its oxygen, and thus, becoming oxidized, at once liberates the hydrogen. From the second generator X' a pipe $l$ connects with the third generator $X^2$, located in the combustion-chamber D, alongside the fixing-retort, and this generator is connected with the last, $X^3$, of the series by means of a pipe $m$. The pipe $l$ from the last generator $X^3$ of the series enters the fixing-retort E at the rear where the rich oil-gas enters from the upper retorts and is carried along through the fixing-retort with the rich oil-gas.

Over the outlet flue or opening K, above the top of the upper retort-chamber B, is a sliding valve or damper Z, which is preferably made of fire-clay or similar material, and which is provided with a handle $n$, which projects out through the side of the brickwork, as shown in Fig. 1. When this damper is closed, and the doors of the fire-chamber are also closed and the fire banked, the brickwork is prevented from giving off or radiating its heat. By the use of this damper, which confines the heat, or rather prevents radiation and escape of the heat from the retorts and the retort-chambers, less fire is required to restart the apparatus and there is less likelihood of the retorts being damaged by becoming chilled.

The fixing-retort E, which is shown in section in Fig. 4, is shown with its lining or protecting-cover removed in Fig. 1 in order that certain parts of the apparatus may be more clearly shown. It will be noticed, however, upon reference to Fig. 4 that on each side face of this retort there are two longitudinally-extending lugs or ribs $o$ and $p$. The upper rib or flange $o$ is of dovetail form in cross-section, while the lower flange or rib inclines upwardly slightly to correspond to the opposing face of the lug or rib o, thereby forming a dovetailed seat on the side of the retort to receive the protecting-slabs q, which are slid into position from either end of the retort. It will be noticed also upon reference to Fig. 4 that the slab or tile q projects beyond the face of the ribs or lugs o and p, and that the bricks r, which are applied to the crown of the retort, extend beyond the upper flange o. Between the bricks r and the slab q is placed a quantity s of fire-clay or other suitable composition, which will cover or protect the rib or flange o from the intense heat to which the retort is subjected. Similarly the lower flange or rib p is protected by a body s of fire-clay, asbestos cement, or similar material.

As before stated, the fixing-retort is placed with its rear end between the vertical slabs c of the boxes S, and hence it is unnecessary to provide the rear part of the fixing-retort with a side coating or protection, but only with a covering or protection for the arch or crown.

Having thus described my invention, what I claim is—

1. In combination with a fire-chamber, and a combustion-chamber; a flue to deliver the products from the former to the latter; and the boxes at the mouth of the flues, provided with the low front wall and the high side wall.

2. In combination with a fire-chamber and a combustion-chamber; flues to deliver the products from the former to the latter; a retort within the combustion-chamber; and a box at the mouth of each flue; said boxes being each provided with a high side wall to protect the retort, and a low front wall.

3. In combination with the fire-chamber and combustion-chamber; an air space or chamber opening into the combustion-chamber; a pipe embedded in the walls of the fire-chamber and opening at one end into the air-space and at the other end open to the atmosphere; a second pipe passing through one of the retort-chambers and open at one end to the atmosphere, and connected at the other end to the first-mentioned pipe; and valves applied to said pipes whereby they may be used separately or together.

4. In combination with a gas-generating retort or retorts; a gas-discharge pipe; a pipe for conveying the heated air to be mixed with the gas; and a relief-seal for the air-pipe.

5. In combination with a gas-generating retort or retorts; a gas-discharge pipe; a coil or heater in which the air to be mixed with the gas is heated; and an inlet-pipe to said coil or heater, provided with two inlet openings and valves.

6. In combination with a gas-generating retort or retorts; a gas-discharge pipe; a coil or heater in which the air to be mixed with the gas is heated; and an inlet-pipe to said coil or heater, provided with two inlet openings and valves and having its end dipped into a seal.

7. In combination with the metallic retort provided on its sides with the laterally-extending longitudinal ribs; the slabs or tiles beveled to fit therebetween; the brick covering the crown of the retort; and the fire-clay covering for the flanges.

In witness whereof I hereunto set my hand in the presence of two witnesses.

THOMAS HENNESSY.

Witnesses:
JOSEPH H. JONES,
JAMES J. NOONAN.